US012689228B2

(12) United States Patent
Lin et al.

(10) Patent No.: US 12,689,228 B2
(45) Date of Patent: Jul. 21, 2026

(54) METHOD FOR SUPPLEMENTING LITHIUM FOR SECONDARY BATTERY AND METHOD FOR CHARGING AND DISCHARGING SECONDARY BATTERY

(71) Applicant: CONTEMPORARY AMPEREX TECHNOLOGY (HONG KONG) LIMITED, Hong Kong (CN)

(72) Inventors: Jianghui Lin, Ningde (CN); Yanjie Zhao, Ningde (CN); Xing Li, Ningde (CN); Haizu Jin, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 663 days.

(21) Appl. No.: 18/329,278

(22) Filed: Jun. 5, 2023

(65) Prior Publication Data

US 2023/0336014 A1      Oct. 19, 2023

Related U.S. Application Data

(63) Continuation of application No. PCT/CN2022/070094, filed on Jan. 4, 2022.

(51) Int. Cl.
*H02J 7/00* (2026.01)
*H01M 4/13* (2010.01)
(Continued)

(52) U.S. Cl.
CPC .............. *H02J 7/875* (2026.01); *H01M 4/13* (2013.01); *H01M 4/364* (2013.01); *H01M 4/505* (2013.01);
(Continued)

(58) Field of Classification Search
CPC .. H02J 7/875; H02J 7/82; H02J 7/933; H01M 4/13; H01M 4/364; H01M 4/505;
(Continued)

(56) References Cited

U.S. PATENT DOCUMENTS 10,559,850 B2 *  2/2020  Dubois ............. H01M 10/0525
2021/0126241 A1  4/2021  Wang et al.

FOREIGN PATENT DOCUMENTS

CN      103996820 A      8/2014
CN      105552344 A      5/2016
(Continued)

OTHER PUBLICATIONS

The European Patent Office (EPO) The Extended European Search Report for Application No. 22891178.0 Feb. 3, 2025 7 Pages.
(Continued)

*Primary Examiner* — Zixuan Zhou
(74) *Attorney, Agent, or Firm* — ANOVA LAW GROUP. PLLC

(57) ABSTRACT

A method for supplementing lithium for a secondary battery includes performing a first round of lithium-supplementing charge and discharge on the secondary battery during routine charge-and-discharge cycles of the secondary battery if a capacity of the secondary battery has reduced by k1 in comparison with an initial capacity and performing a round of lithium-supplementing charge and discharge on the secondary battery after the first round of lithium-supplementing charge and discharge if the capacity of the secondary battery has reduced by k2 in comparison with the capacity achieved after a previous round of lithium-supplementing charge and discharge. k1 and k2 each are in a range from 1.5% to 17%. In a round of lithium-spplementing charge and discharge, a number of times of charge and discharge is at least one and a charge cut-off voltage is in a range from 4.45 V to 5 V.

16 Claims, 3 Drawing Sheets

(51) Int. Cl.

| | | |
|---|---|---|
| *H01M 4/36* | (2006.01) | |
| *H01M 4/505* | (2010.01) | |
| *H01M 4/525* | (2010.01) | |
| *H01M 4/62* | (2006.01) | |
| *H01M 10/42* | (2006.01) | |
| *H01M 10/44* | (2006.01) | |
| *H02J 7/82* | (2026.01) | |
| *H02J 7/90* | (2026.01) | |
| *H01M 4/02* | (2006.01) | |

(52) U.S. Cl.
CPC ............. *H01M 4/525* (2013.01); *H01M 4/62* (2013.01); *H01M 10/4235* (2013.01); *H01M 10/44* (2013.01); *H02J 7/82* (2026.01); *H02J 7/933* (2026.01); *H01M 2004/028* (2013.01)

(58) Field of Classification Search
CPC .... H01M 4/525; H01M 4/62; H01M 10/4235; H01M 10/44; H01M 2004/028
USPC ......................... 320/134; 429/231.9, 231.95
See application file for complete search history.

(56) References Cited

FOREIGN PATENT DOCUMENTS

| | | | | | |
|---|---|---|---|---|---|
| CN | 107104245 | A | 8/2017 | | |
| CN | 107978790 | A | 5/2018 | | |
| CN | 109616629 | A | 4/2019 | | |
| CN | 109755474 | A | 5/2019 | | |
| CN | 111834622 | A | 10/2020 | | |
| CN | 113540591 | A | 10/2021 | | |
| EP | 3796432 | A1 * | 3/2021 | ............. | H01M 4/62 |
| EP | 3923395 | A1 | 12/2021 | | |
| JP | 2012195055 | A | 10/2012 | | |

OTHER PUBLICATIONS

The World Intellectual Property Organization (WIPO) International Search Report with Written Opinion for PCT/CN2022/070094 Sep. 29, 2022 13 pages (including English translation).

* cited by examiner

5

5

METHOD FOR SUPPLEMENTING LITHIUM FOR SECONDARY BATTERY AND METHOD FOR CHARGING AND DISCHARGING SECONDARY BATTERY

CROSS-REFERENCE TO RELATED APPLICATION

This application is a continuation of International Application No. PCT/CN2022/070094, filed on Jan. 4, 2022, the entire content of which is incorporated herein by reference.

TECHNICAL FIELD

This application relates to the technical field of secondary batteries, and in particular, to a method for supplementing lithium for a secondary battery and a method for charging and discharging a secondary battery.

BACKGROUND

In recent years, secondary batteries have been applied wider in many fields, including energy storage power systems such as hydro, thermal, wind, and solar power stations, and other fields such as electric tools, electric bicycles, electric motorcycles, and electric vehicles, military equipment, and aerospace. The great development of the secondary batteries gives rise to higher requirements on the energy density, cycle performance, safety performance, and other performance of the batteries. In addition, the capacity of the secondary batteries is prone to reducing during charge-and-discharge cycles, thereby decreasing a cycle capacity retention rate of the secondary batteries and shortening a cycle life of the secondary batteries. Therefore, it is urgent to solve technical problems caused by the capacity reduction of the secondary batteries.

SUMMARY

This application is put forward in view of the foregoing problems, and an objective of this application is to provide a method for supplementing lithium for a secondary battery and a method for charging and discharging a secondary battery. Lithium is supplemented in time based on the capacity reduction status during routine charge-and-discharge cycles of the secondary battery, thereby alleviating the problem of the capacity reduction of the secondary battery during the cycles, and solving the problems of a decreased cycle capacity retention rate and a shortened life of the secondary battery caused by the capacity reduction of the secondary battery.

To achieve the foregoing objective, a first aspect of this application provides a method for supplementing lithium for a secondary battery, including the following steps:

performing a first round of lithium-supplementing charge and discharge on the secondary battery during routine charge-and-discharge cycles of the secondary battery if a capacity of the secondary battery has reduced by k1 in comparison with an initial capacity, and then performing a round of lithium-supplementing charge and discharge on the secondary battery if the capacity of the secondary battery has reduced by k2 in comparison with the capacity achieved after a previous round of lithium-supplementing charge and discharge, where k1 and k2 each are 1.5% to 17% independently, a number of times of charge and discharge in each round of lithium-supplementing charge and discharge is at least one, and a charge cut-off voltage of the lithium-supplementing charge and discharge is 4.45 V to 5 V, and optionally 4.45 V to 4.6 V; and a positive electrode plate of the secondary battery includes a lithium supplement material, and the lithium supplement material is at least one selected from $Li_2O$, $Li_2O_2$, $Li_2S$, $Li_6CoO_4$, $Li_5FeO_4$, $Li_2NiO_2$, $Li_2DHBN(3,4$-dihydroxybenzonitrile dilithium salt), $Li_2C_2O_4$, and $xLi_2MnO_3 \cdot (1-x)LiNi_{y1}Co_{y2}Mn_{y3}O_2$, where $0 < x \leq 1$, y1, y2, and y3 each are 0 to 1, and a sum of y1, y2, and y3 is 1.

Therefore, during routine charge-and-discharge cycles of the secondary battery, this application supplements lithium in time based on the proposed solution in view of the capacity reduction status of the battery, thereby alleviating the capacity reduction during the cycling of the battery and increasing the cycle capacity retention rate and cycle life of the battery. In addition, compared with the lithium supplementation performed for the battery during the first charge-and-discharge cycle, the method of this application does not need to increase the amount of the negative active material, so that the battery keeps a relatively high energy density.

In any embodiment, k1 and k2 each are 2% to 15% independently, and optionally 2% to 12%. When the battery capacity reduces to the range specified above, lithium is supplemented, thereby further alleviating the capacity reduction during the cycling of the battery and further increasing the cycle capacity retention rate and the cycle life of the battery.

In any embodiment, a discharge cut-off voltage applied in the lithium-supplementing charge and discharge is a discharge cut-off voltage applied in a routine charge-and-discharge cycle. The lithium supplement material in this application achieves a good lithium supplementing effect even when the charge cut-off voltage is as high as 4.45 V to 5 V. By using the discharge cut-off voltage of the routine charge-and-discharge cycles as the discharge cut-off voltage of the lithium-supplementing charge and discharge, this application facilitates continuation of the routine charge-and-discharge cycles as soon as the lithium-supplementing charge and discharge are completed, without a need of additional adjustment and transition. Therefore, the method is simpler and more convenient.

In any embodiment, the lithium-supplementing charge and discharge adopt constant-current charge. Therefore, the constant-current charge improves the efficiency of the lithium-supplementing charge and discharge, and decreases the damage to the interior of the battery.

In any embodiment, a charge current applied in the lithium-supplementing charge and discharge is a charge current applied in a routine charge-and-discharge cycle. The lithium supplement material in this application achieves a good lithium supplementing effect even when the charge cut-off voltage is as high as 4.45 V to 5 V. The lithium-supplementing charge and discharge adopt the charge current of a routine charge-and-discharge cycle, so that less damage is caused to the interior of the battery, and the method is simpler.

In any embodiment, the lithium-supplementing charge and discharge adopt constant-current discharge. The constant-current discharge improves the efficiency of the lithium-supplementing charge and discharge, and decreases the damage to the interior of the battery.

In any embodiment, a discharge current applied in the lithium-supplementing charge and discharge is a discharge current applied in a routine charge-and-discharge cycle. The lithium supplement material in this application achieves an excellent lithium supplementing effect even when the charge cut-off voltage is as high as 4.45 V to 5 V. The lithium-supplementing charge and discharge adopt the discharge current of a routine charge-and-discharge cycle, so that less damage is caused to the interior of the battery, and the method is simpler.

In any embodiment, during the lithium-supplementing charge and discharge, charging is performed first, and then discharging is performed after a period of static standing.

In any embodiment, the static standing period is 2 to 35 minutes, and optionally 5 to 30 minutes.

Therefore, the static standing process in the period between the charge step and the discharge step relaxes the interior of the battery, eliminates polarization inside the battery, and balances the voltage.

In any embodiment, the lithium supplement material is $0.4LiNi_{0.5}Co_{0.1}Mn_{0.4}O_2 \cdot 0.6Li_2MnO_3$. This lithium supplement material enables quick and effective supplementation of lithium based on the proposed method during the routine charge-and-discharge cycle of the secondary battery, thereby further alleviating the capacity reduction of the battery and further increasing the cycle capacity retention rate and cycle life of the secondary battery.

In any embodiment, in the positive electrode plate, a mass ratio between a positive active material and the lithium supplement material is 1:8 to 8:1, and optionally 2:8 to 7:3. When the mass ratio between the positive active material and the lithium supplement material falls within the above range, the lithium can be supplemented for the battery effectively on the premise of meeting the capacity requirement of the battery, thereby alleviating the capacity reduction of the battery and increasing the cycle capacity retention rate and cycle life of the battery.

A second aspect of this application further provides a method for charging and discharging a secondary battery, including the following steps:

supplementing lithium for the secondary battery according to the method disclosed in the first aspect of this application; and continuing to perform the routine charge-and-discharge cycles on the secondary battery after the lithium supplementing until an end of life of the battery.

Therefore, during routine charge-and-discharge cycles of the secondary battery, this application supplements lithium in time in view of the capacity reduction status of the battery, thereby alleviating the capacity reduction during the cycling of the battery and increasing the cycle capacity retention rate and cycle life of the battery. In addition, compared with the conventional lithium supplementation performed for the battery during the first charge-and-discharge cycle, this application supplements lithium in time during the routine charge-and-discharge cycles of the secondary battery, without a need to increase the amount of the negative active material, so that the battery achieves a relatively high energy density.

Figure 1:
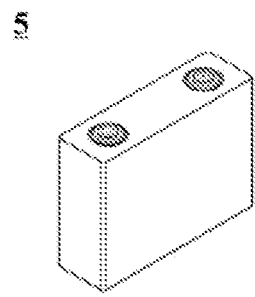
FIG. 1 is a schematic diagram of a secondary battery according to an embodiment of this application.

REFERENCE NUMERALS 1. battery pack; 2. upper box; 3. lower box; 4. battery module; 5. secondary battery; 51. housing; 52. electrode assembly; 53. cover plate.

DETAILED DESCRIPTION OF EMBODIMENTS

The following describes and discloses in detail a method for supplementing lithium for a secondary battery and a method for charging according to this application with due reference to drawings. However, unnecessary details may be omitted in some cases. For example, a detailed description of a well-known matter or repeated description of an essentially identical structure may be omitted. That is intended to prevent the following descriptions from becoming unnecessarily lengthy, and to facilitate understanding by a person skilled in the art. In addition, the drawings and the following descriptions are intended for a person skilled in the art to thoroughly understand this application, but not intended to limit the subject-matter set forth in the claims.

A "range" disclosed herein is defined in the form of a lower limit and an upper limit. A given range is defined by selecting a lower limit and an upper limit. The selected lower and upper limits define the boundaries of the given range. A range so defined may be inclusive or exclusive of the end values, and a lower limit of one range may be arbitrarily combined with an upper limit of another range to form a range. For example, if a given parameter falls within a range of 60 to 120 and a range of 80 to 110, it is expectable that the parameter may fall within a range of 60 to 110 and a range of 80 to 120 as well. In addition, if lower-limit values 1 and 2 are listed, and if upper-limit values 3, 4, and 5 are listed, the following ranges are all expectable: 1 to 3, 1 to 4, 1 to 5, 2 to 3, 2 to 4, and 2 to 5. Unless otherwise specified herein, a numerical range "a to b" is a brief representation of a combination of any real numbers between a and b inclusive, where both a and b are real numbers. For example, a numerical range "0 to 5" herein means all real numbers recited between 0 and 5 inclusive, and the expression "0 to 5" is just a brief representation of a combination of such numbers. In addition, a statement that a parameter is an integer greater than or equal to 2 is equivalent to a disclosure that the parameter is an integer such as 2, 3, 4, 5, 6, 7, 8, 9, 10, 11, 12, and so on.

Unless otherwise expressly specified herein, any embodiments and optional embodiments hereof may be combined with each other to form a new technical solution.

Unless otherwise expressly specified herein, any technical features and optional technical features hereof may be combined with each other to form a new technical solution.

Unless otherwise expressly specified herein, all steps described herein may be performed in sequence or at random, and, in some embodiment, in sequence. For example, that a method includes steps (a) and (b) indicates that the method may include steps (a) and (b) performed in sequence, or steps (b) and (a) performed in sequence. For example, that the method may further include step (c)

indicates that step (c) may be added into the method in any order. For example, the method may include steps (a), (b), and (c), or may include steps (a), (c), and (b), or may include steps (c), (a), and (b), and so on.

Unless otherwise expressly specified herein, "include" and "comprise" mentioned herein mean open-ended inclusion, or closed-ended inclusion. For example, the terms "include" and "comprise" may mean inclusion of other items that are not recited, or inclusion of only the items recited.

Unless otherwise expressly specified herein, the term "or" is inclusive. For example, the expression "A or B" means "A alone, B alone, or both A and B". More specifically, any one of the following conditions satisfies the condition "A or B": A is true (or existent) and B is false (or absent); A is false (or absent) and B is true (or existent); and, both A and B are true (or existent).

[Secondary Battery]

A secondary battery, also known as a rechargeable battery or storage battery, is a battery that is reusable after an active material in the battery is activated by charging the battery that has been discharged.

Generally, a secondary battery includes a positive electrode plate, a negative electrode plate, a separator, and an electrolytic solution. During charge and discharge of the battery, active ions (such as lithium ions) are shuttled between the positive electrode plate and the negative electrode plate by intercalation and deintercalation. Disposed between the positive electrode plate and the negative electrode plate, the separator primarily serves to prevent a short circuit between the positive electrode plate and the negative electrode plate, and is penetrable by the active ions. The electrolytic solution is located between the positive electrode plate and the negative electrode plate, and primarily serves to conduct the active ions.

<Method for Supplementing Lithium for a Secondary Battery>

A method for supplementing lithium for a secondary battery according to an embodiment of this application includes the following steps:

performing a first round of lithium-supplementing charge and discharge on the secondary battery during routine charge-and-discharge cycles of the secondary battery if a capacity of the secondary battery has reduced by k1 in comparison with an initial capacity, and then performing a round of lithium-supplementing charge and discharge on the secondary battery if the capacity of the secondary battery has reduced by k2 in comparison with the capacity achieved after a previous round of lithium-supplementing charge and discharge, where k1 and k2 each are 1.5% to 17% independently, a number of times of charge and discharge in each round of lithium-supplementing charge and discharge is at least one (for example, one), and a charge cut-off voltage of the lithium-supplementing charge and discharge is 4.45 V to 5 V, and optionally 4.45 V to 4.6 V; and a positive electrode plate of the secondary battery includes a lithium supplement material, and the lithium supplement material is at least one selected from $Li_2O$, $Li_2O_2$, $Li_2S$, $Li_6CoO_4$, $Li_5FeO_4$, $Li_2NiO_2$, $Li_2DHBN$(full name: 3,4-dihydroxybenzonitrile dilithium salt), $Li_2C_2O_4$, and $xLi_2MnO_3 \cdot (1-x)LiNi_{y1}Co_{y2}Mn_{y3}O_2$, where $0<x\leq1$, y1, y2, and y3 each are 0 to 1, and a sum of y1, y2, and y3 is 1.

Although the underlying mechanism still remains unclear, the applicant hereof unexpectedly finds that a discharge cut-off voltage as high as 4.45 V to 5 V can activate the lithium supplement material of this application to release more active lithium ions. Therefore, in a routine charge-and-discharge cycle of the secondary battery, this application releases active lithium ions as a supplement in time through the high discharge cut-off voltage in view of the capacity reduction status of the battery, thereby alleviating the reduction of the battery capacity and increasing the cycle capacity retention rate and cycle life of the battery. In addition, in conventional lithium supplementation performed during a first charge-and-discharge cycle of the battery, the amount of the negative active material needs to be increased accordingly. By contrast, in this application, the lithium supplementation is performed during the routine cycles of the battery without a need to increase the amount of the negative active material, thereby ensuring that the battery possesses a relatively high energy density.

In some embodiments, k1 and k2 each are 2% to 15% independently, and optionally 2% to 12%, for example, 2%, 5%, 8%, or 10%. When the battery capacity reduces to the range specified above, active lithium ions are released as a supplement, thereby further alleviating the capacity reduction during the cycling of the battery and further increasing the cycle capacity retention rate and the cycle life of the battery.

In some embodiments, a discharge cut-off voltage applied in the lithium-supplementing charge and discharge is a discharge cut-off voltage applied in a routine charge-and-discharge cycle. The lithium supplement material in this application achieves a good lithium supplementing effect even when the charge cut-off voltage is as high as 4.45 V to 5 V. By using the discharge cut-off voltage of the routine charge-and-discharge cycles as the discharge cut-off voltage of the lithium-supplementing charge and discharge, this application facilitates continuation of the routine charge-and-discharge cycles as soon as the lithium-supplementing charge and discharge are completed, without a need of additional adjustment and transition. Therefore, the method is simpler and more convenient. A person skilled in the art is aware of the value range of the discharge cut-off voltage of a routine charge-and-discharge cycle. For example, under a condition of 25° C., the discharge cut-off voltage of a routine charge-and-discharge cycle is generally 2.5 V to 2.8 V.

In some embodiments, the lithium-supplementing charge and discharge adopt constant-current charge. The constant-current charge improves the efficiency of the lithium-supplementing charge and discharge, and decreases the damage to the interior of the battery.

In some embodiments, a charge current applied in the lithium-supplementing charge and discharge is a charge current applied in a routine charge-and-discharge cycle. The lithium supplement material in this application achieves a good lithium supplementing effect even when the charge cut-off voltage is as high as 4.45 V to 5 V. The lithium-supplementing charge and discharge adopt the charge current of a routine charge-and-discharge cycle, so that less damage is caused to the interior of the battery, and the method is simpler. A person skilled in the art is aware of the value range of the charge current of the routine charge-and-discharge cycle. For example, the value of the charge current of the routine charge-and-discharge cycle is determined based on a capacity of a battery cell, and is generally expressed by a charge rate. A typical charge rate ranges from 0.01 C to 5 C. Unless otherwise specially required, the charge rate is generally 0.33 C or 1 C.

In some embodiments, the lithium-supplementing charge and discharge adopt constant-current discharge. The constant-current discharge improves the efficiency of the lithium-supplementing charge and discharge, and decreases the damage to the interior of the battery.

In some embodiments, a discharge current applied in the lithium-supplementing charge and discharge is a discharge current applied in a routine charge-and-discharge cycle. The lithium supplement material in this application achieves an excellent lithium supplementing effect even when the charge cut-off voltage is as high as 4.45 V to 5 V. The lithium-supplementing charge and discharge adopt the discharge current of a routine charge-and-discharge cycle, so that less damage is caused to the interior of the battery, and the method is simpler. A person skilled in the art is aware of the value range of the discharge current of the routine charge-and-discharge cycle. For example, the value of the discharge current of the routine charge-and-discharge cycle is generally expressed by a charge rate. A typical charge rate ranges from 0.01 C to 5 C. Unless otherwise specially required, the charge rate is generally 0.33 C or 1 C.

In some embodiments, during the lithium-supplementing charge and discharge, charging is performed first, and then discharging is performed after a period of static standing.

In some embodiments, the static standing period is 2 to 35 minutes, and optionally 5 to 30 minutes, for example, 10, 15, 20, or 25 minutes.

Therefore, the static standing process in the period between the charge step and the discharge step relaxes the interior of the battery, eliminates polarization inside the battery, and balances the voltage.

In some embodiments, y1 is 0.3 to 0.7, y2 is 0 to 0.3, and y3 is 0.2 to 0.6.

In some embodiments, the lithium supplement material is $0.4LiNi_{0.5}Co_{0.1}Mn_{0.4}O_2 \cdot 0.6Li_2MnO_3$. This lithium supplement material enables quick and effective supplementation of lithium based on the proposed method during the routine charge-and-discharge cycle of the secondary battery, thereby further alleviating the capacity reduction of the battery and further increasing the cycle capacity retention rate and cycle life of the battery.

In some embodiments, in the positive electrode plate, a mass ratio between a positive active material and the lithium supplement material is 1:8 to 8:1, and optionally 2:8 to 7:3, for example, 3:8, 1:2, 1:1, 7:1, 7:4, 7:5, or 4:1. When the mass ratio between the positive active material and the lithium supplement material falls within the above range, the lithium can be supplemented for the battery effectively on the premise of meeting the capacity requirement of the battery, thereby alleviating the capacity reduction of the battery and increasing the cycle capacity retention rate and cycle life of the battery.

In some embodiments, the capacity is the discharge capacity of the secondary battery.

In some embodiments, an initial capacity of the secondary battery is a discharge capacity of the secondary battery charged and discharged in a first cycle.

<Method for Charging and Discharging a Secondary Battery>

A method for charging and discharging a secondary battery is provided according to an embodiment of this application, including the following steps:

supplementing lithium for the secondary battery according to the method disclosed in the first aspect of this application; and continuing to perform the routine charge-and-discharge cycles on the secondary battery after the lithium supplementing until an end of life of the battery.

Therefore, during routine charge-and-discharge cycles of the secondary battery, this application supplements lithium in time in view of the capacity reduction status of the battery, thereby alleviating the capacity reduction during the cycling of the battery and increasing the cycle capacity retention rate and cycle life of the battery. In addition, compared with the conventional lithium supplementation performed for the battery during the first charge-and-discharge cycle, this application supplements lithium in time during the routine charge-and-discharge cycles of the secondary battery, without a need to increase the amount of the negative active material, so that the battery achieves a relatively high energy density.

[Positive Electrode Plate]

The positive electrode plate generally includes a positive current collector and a positive film layer disposed on at least one surface of the positive current collector. The positive film layer includes a positive active material and the lithium supplement material described herein above.

As an example, the positive current collector includes two surfaces opposite to each other in a thickness direction thereof. The positive film layer is disposed on either or both of the two opposite surfaces of the positive current collector.

In some embodiments, the positive current collector may be a metal foil or a composite current collector. For example, the metal foil may be an aluminum foil. The composite current collector may include a polymer material substrate and a metal layer formed on at least one surface of the polymer material substrate. The composite current collector may be formed by overlaying a polymer material substrate with a metal material (for example, aluminum, aluminum alloy, nickel, nickel alloy, titanium, titanium alloy, silver, and silver alloy). The polymer material substrate may be, for example, polypropylene (PP), polyethylene terephthalate (PET), polybutylene terephthalate (PBT), polystyrene (PS), or polyethylene (PE).

In some embodiments, the positive active material may be a positive active material that is well known in the art for use in a battery. As an example, the positive active material may include at least one of the following materials: olivine-structured lithium-containing phosphate, lithium transition metal oxide, and a modified compound thereof. However, this application is not limited to such materials, and other conventional materials usable as a positive active material of a battery may be used instead. One of the positive active materials may be used alone, or at least two thereof may be used in combination. Examples of the lithium transition metal oxide may include, but are not limited to, at least one of lithium cobalt oxide (such as $LiCoO_2$), lithium nickel oxide (such as $LiNiO_2$), lithium manganese oxide (such as $LiMnO_2$, and $LiMn_2O_4$), lithium nickel cobalt oxide, lithium manganese cobalt oxide, lithium nickel manganese oxide, lithium nickel cobalt manganese oxide (such as $LiNi_{1/3}Co_{1/3}Mn_{1/3}O_2$ (briefly referred to as NCM333), $LiNi_{0.5}Co_{0.2}Mn_{0.3}O_2$ (briefly referred to as NCM523), $LiNi_{0.5}Co_{0.25}Mn_{0.25}O_2$ (briefly referred to as NCM211), $LiNi_{0.6}Co_{0.2}Mn_{0.2}O_2$ (briefly referred to as NCM622), $LiNi_{0.8}Co_{0.1}Mn_{0.1}O_2$ (briefly referred to as NCM811)), lithium nickel cobalt aluminum oxide (such as $LiNi_{0.85}Co_{0.15}Al_{0.05}O_2$), or a modified compound thereof. Examples of the olivine-structured lithium-containing phosphate may include, but are not limited to, at least one of lithium iron phosphate (such as $LiFePO_4$ (briefly referred to as LFP)), a composite of lithium iron phosphate and carbon, lithium manganese phosphate (such as $LiMnPO_4$), a composite of lithium manganese phosphate and carbon, lithium manganese iron phosphate, or a composite of lithium manganese iron phosphate and carbon.

In some embodiments, the positive film layer further optionally includes a binder. As an example, the binder may include at least one of polyvinylidene difluoride (PVDF), polytetrafluoroethylene (PTFE), poly(vinylidene fluoride-co-tetrafluoroethylene-co-propylene), poly (vinylidene fluoride-co-hexafluoropropylene-co-tetrafluoroethylene), poly (tetrafluoroethylene-co-hexafluoropropylene), or fluorinated acrylate resin.

In some embodiments, the positive film layer further optionally includes a conductive agent. As an example, the conductive agent may include at least one of superconductive carbon, acetylene black, carbon black, Ketjen black, carbon dots, carbon nanotubes, graphene, or carbon nanofibers.

In some embodiments, the positive electrode plate may be prepared according to the following method: dispersing the ingredients of the positive electrode plate, such as the positive active material, the lithium supplement material, the conductive agent, and the binder and any other ingredients, in a solvent (such as N-methyl-pyrrolidone) to form a positive slurry, coating a positive current collector with the positive slurry, and performing steps such as drying and cold calendering to obtain a positive electrode plate.

[Negative Electrode Plate]

The negative electrode plate includes a negative current collector and a negative film layer disposed on at least one surface of the negative current collector. The negative film layer includes a negative active material.

As an example, the negative current collector includes two surfaces opposite to each other in a thickness direction thereof. The negative film layer is disposed on either or both of the two opposite surfaces of the negative current collector.

In some embodiments, the negative current collector may be a metal foil or a composite current collector. For example, the metal foil may be a copper foil. The composite current collector may include a polymer material base layer and a metal layer formed on at least one surface of the polymer material base layer. The composite current collector may be formed by overlaying a polymer material substrate with a metal material (for example, copper, copper alloy, nickel, nickel alloy, titanium, titanium alloy, silver, and silver alloy). The polymer material substrate may be, for example, polypropylene (PP), polyethylene terephthalate (PET), polybutylene terephthalate (PBT), polystyrene (PS), or polyethylene (PE).

In some embodiments, the negative active material may be a negative active material that is well known in the art for use in a battery. As an example, the negative active material may include at least one of the following materials: artificial graphite, natural graphite, soft carbon, hard carbon, silicon-based material, tin-based material, lithium titanium oxide, and the like. The silicon-based material may be at least one selected from simple-substance silicon, silicon-oxygen compound, silicon-carbon composite, silicon-nitrogen composite, or silicon alloy. The tin-based material may be at least one selected from simple-substance tin, tin-oxygen compound, or tin alloy. However, this application is not limited to such materials, and other conventional materials usable as a negative active material of a battery may be used instead. One of the negative active materials may be used alone, or at least two thereof may be used in combination.

In some embodiments, the negative film layer further optionally includes a binder. As an example, the binder may be at least one selected from styrene-butadiene rubber (SBR), polyacrylic acid (PAA), polyacrylic acid sodium (PAAS), polyacrylamide (PAM), polyvinyl alcohol (PVA), sodium alginate (SA), polymethyl acrylic acid (PMAA), and carboxymethyl chitosan (CMCS).

In some embodiments, the negative film layer further optionally includes a conductive agent. As an example, the conductive agent may be at least one selected from superconductive carbon, acetylene black, carbon black, Ketjen black, carbon dots, carbon nanotubes, graphene, or carbon nanofibers.

In some embodiments, the negative film layer further optionally includes other agents, such as a thickener (for example, sodium carboxymethyl cellulose (CMC-Na)).

In some embodiments, the negative electrode plate may be prepared according to the following method: dispersing the ingredients of the negative electrode plate such as the negative active material, the conductive agent, and the binder and any other ingredients in a solvent (such as deionized water) to form a negative slurry, coating a negative current collector with the negative slurry, and performing steps such as drying and cold pressing to obtain the negative electrode plate.

[Electrolyte]

The electrolyte serves to conduct ions between the positive electrode plate and the negative electrode plate. The type of the electrolyte is not particularly limited in this application, and may be selected as required. For example, the electrolyte may be in a liquid state or gel state, or all solid state.

In some embodiments, the electrolyte is in a liquid state and includes an electrolyte salt and a solvent.

In some embodiments, the electrolyte salt may be at least one selected from lithium hexafluorophosphate, lithium tetrafluoroborate, lithium perchlorate, lithium hexafluoroarsenate, lithium bisfluorosulfonimide, lithium bistrifluoromethanesulfonimide, lithium trifluoromethanesulfonate, lithium difluorophosphate, lithium difluoro(oxalato)borate, lithium bis(oxalato)borate, lithium difluoro(bisoxalato) phosphate, and lithium tetrafluoro(oxalato)phosphate.

In some embodiments, the solvent may be at least one selected from ethylene carbonate, propylene carbonate, ethyl methyl carbonate, diethyl carbonate, dimethyl carbonate, dipropyl carbonate, methyl propyl carbonate, ethylene propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, methyl sulfonyl methane, ethyl methyl sulfone, and (ethylsulfonyl)ethane.

In some embodiments, the electrolytic solution further optionally includes an additive. As an example, the additive may include a negative film-forming additive or a positive film-forming additive. The additive may further include an additive capable of improving some performance of the battery, for example, an additive for improving overcharge performance of the battery, or an additive for improving high- or low-temperature performance of the battery.

[Separator]

In some embodiments, the secondary battery further includes a separator. The type of the separator is not particularly limited in this application, and may be any well-known porous separator that is highly stable both chemically and mechanically.

In some embodiments, the separator may be made of a material that is at least one selected from glass fiber, non-woven fabric, polyethylene, polypropylene, or polyvinylidene difluoride. The separator may be a single-layer film or a multilayer composite film, without being particularly limited. When the separator is a multilayer composite film, materials in different layers may be identical or different, without being particularly limited.

In some embodiments, the positive electrode plate, the negative electrode plate, and the separator may be made into an electrode assembly by winding or stacking.

In some embodiments, the secondary battery may include an outer package. The outer package may be configured to package the electrode assembly and the electrolyte.

In some embodiments, the outer package of the secondary battery may be a hard shell such as a hard plastic shell, an aluminum shell, a steel shell, or the like. Alternatively, the outer package of the secondary battery may be a soft package such as a pouch-type soft package. The soft package may be made of plastic such as polypropylene, polybutylene terephthalate, or polybutylene succinate.

The shape of the secondary battery is not particularly limited in this application, and may be cylindrical, prismatic or any other shape. FIG. 1 shows a prismatic secondary battery 5 as an example.

Figure 2:
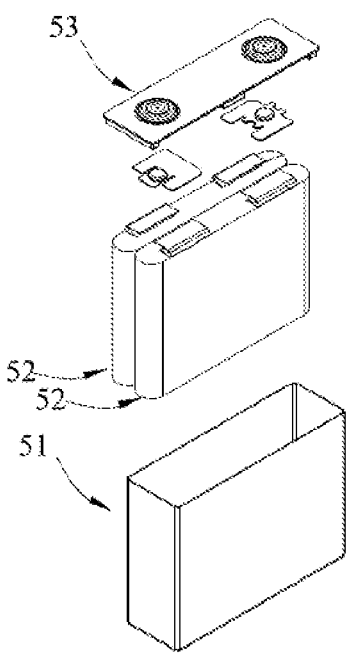
FIG. 2 is an exploded view of a secondary battery shown in FIG. 1 according to an embodiment of this application.

In some embodiments, referring to FIG. 2, the outer package may include a housing 51 and a cover plate 53. The housing 51 may include a bottom plate and a side plate connected to the bottom plate. The bottom plate and the side plate close in to form an accommodation cavity. An opening that communicates with the accommodation cavity is made on the housing 51. The cover plate 53 can fit and cover the opening to close the accommodation cavity. The positive electrode plate, the negative electrode plate, and the separator may be made into the electrode assembly 52 by winding or stacking. The electrode assembly 52 is packaged in the accommodation cavity. The electrolytic solution infiltrates in the electrode assembly 52. The number of electrode assemblies 52 in a secondary battery 5 may be one or more, and may be selected by a person skilled in the art as actually required.

In some embodiments, the secondary battery may be assembled into a battery module. The battery module may include one or more secondary batteries, and the specific number of secondary batteries in a battery module may be selected by a person skilled in the art depending on practical applications and capacity of the battery module.

Figure 3:
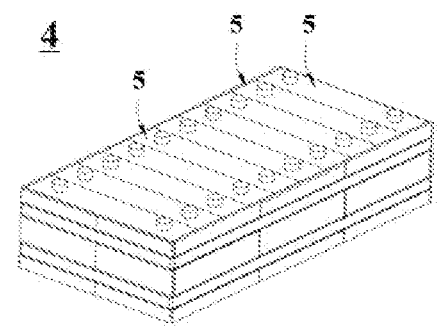
FIG. 3 is a schematic diagram of a battery module according to an embodiment of this application.

FIG. 3 shows a battery module 4 as an example. Referring to FIG. 3, in the battery module 4, a plurality of secondary batteries 5 may be arranged sequentially along a length direction of the battery module 4. Alternatively, the secondary batteries may be arranged in any other manner. Further, the plurality of secondary batteries 5 may be fixed by a fastener.

Optionally, the battery module 4 may further include a shell that provides an accommodation space. The plurality of secondary batteries 5 are accommodated in the accommodation space.

In some embodiments, the battery module may be assembled into a battery pack. The battery pack may include one or more battery modules, and the specific number of battery modules in a battery pack may be selected by a person skilled in the art depending on practical applications and capacity of the battery pack.

Figure 4:
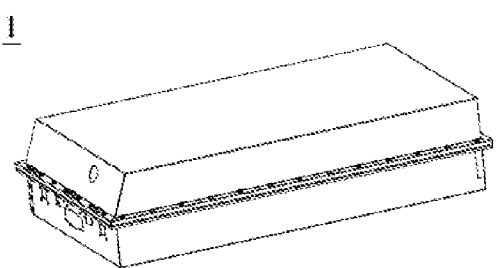
FIG. 4 is a schematic diagram of a battery pack according to an embodiment of this application.
Figure 5:
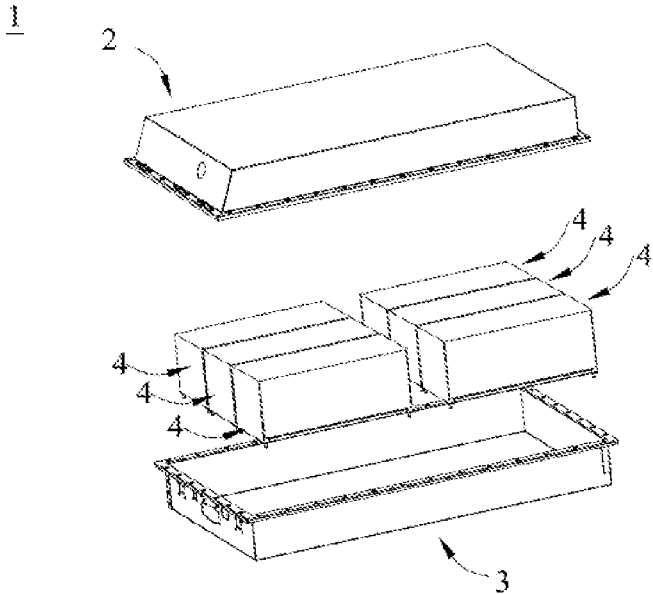
FIG. 5 is an exploded view of the battery pack shown in FIG. 4 according to an embodiment of this application.

FIG. 4 and FIG. 5 show a battery pack 1 as an example. Referring to FIG. 4 and FIG. 5, the battery pack 1 may include a battery box and a plurality of battery modules 4 disposed in the battery box. The battery box includes an upper box 2 and a lower box 3. The upper box 2 fits the lower box 3 to form a closed space for accommodating the battery modules 4. The plurality of battery modules 4 may be arranged in the battery box in any manner.

Further, an electrical device may include at least one of the secondary battery, the battery module, or the battery pack. The secondary battery, the battery module, or the battery pack may be used as a power supply of the electrical device, or used as an energy storage unit of the electrical device. The electrical device may include, but without being limited to, a mobile device (such as a mobile phone or a laptop computer), an electric vehicle (such as a battery electric vehicle, a hybrid electric vehicle, a plug-in hybrid electric vehicle, an electric bicycle, an electric scooter, an electric golf cart, or an electric truck), an electric train, a ship, a satellite system, or an energy storage system.

The secondary battery, the battery module, or the battery pack may be selected for the electrical device according to practical requirements of the electrical device.

Figure 6:
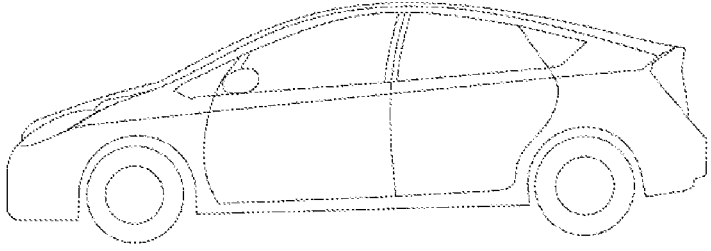
FIG. 6 is a schematic diagram of an electrical device that uses a secondary battery as a power supply according to an embodiment of this application.

FIG. 6 shows an electrical device as an example. The electrical device may be a battery electric vehicle, a hybrid electric vehicle, a plug-in hybrid electric vehicle, or the like. The electrical device may adopt a battery pack or a battery module in order to meet the requirements of the electrical device on a high power and a high energy density of the secondary battery.

EMBODIMENTS

The following describes embodiments of this application. The embodiments described below are illustrative, and are merely intended to construe this application but not to limit this application. In a case that no specific technique or condition is specified in an embodiment, the techniques or conditions described in the literature in this field or described in the instruction manual of the product may apply. A reagent or instrument used herein without specifying the manufacturer is a conventional product that is commercially available in the market.

Embodiment 1

1. Preparing a positive electrode plate: Mixing well lithium iron phosphate ($LiFePO_4$) as a positive active material, a lithium-rich manganese-based material ($0.4LiNi_{0.5}Co_{0.1}Mn_{0.4}O_2 \cdot 0.6Li_2MnO_3$) as a lithium supplement additive, conductive carbon, and polyvinylidene difluoride (PVDF) as a binder at a mass ratio of 48:48:2.5:1.5. Adding a solvent N-methyl-pyrrolidone (NMP), and adjusting a solid content of the solution to a value that ranges from 70% W/W to 80% W/W. Stirring well to make a positive slurry. Coating a positive current collector aluminum foil with the positive slurry homogeneously, and then performing drying, cold calendering, and slitting to obtain a positive electrode plate.

2. Preparing a negative electrode plate: Dry-mixing graphite and conductive carbon at a mass ratio of 97:3, adding deionized water, and adjusting a solid content of the solution to a value that ranges from 45% W/W to 55% W/W. Stirring well to make a negative slurry. Coating a negative current collector copper foil with the negative slurry, and then performing drying, cold calendering, and slitting to obtain a negative electrode plate.

3. Separator: Using a polypropylene film as a separator.

4. Preparing an electrolytic solution: Mixing ethylene carbonate (EC), ethyl methyl carbonate (EMC), and diethyl carbonate (DEC) at a volume ratio of 1:1:1, and dissolving $LiPF_6$ in the forgoing solution homogeneously to obtain an electrolytic solution. In the electrolytic solution, the concentration of the $LiPF_6$ is 1 mol/L.

5. Preparing a secondary battery: Stacking the positive electrode plate, the separator, and the negative electrode plate in sequence, and winding the stacked structure to obtain an electrode assembly. Placing the electrode assembly into an outer package, injecting the electrolytic solution prepared above, and performing steps such as packaging, standing, chemical formation, and aging to obtain a lithium-ion battery.

6. Method for charging and discharging a secondary battery

Figure 7:
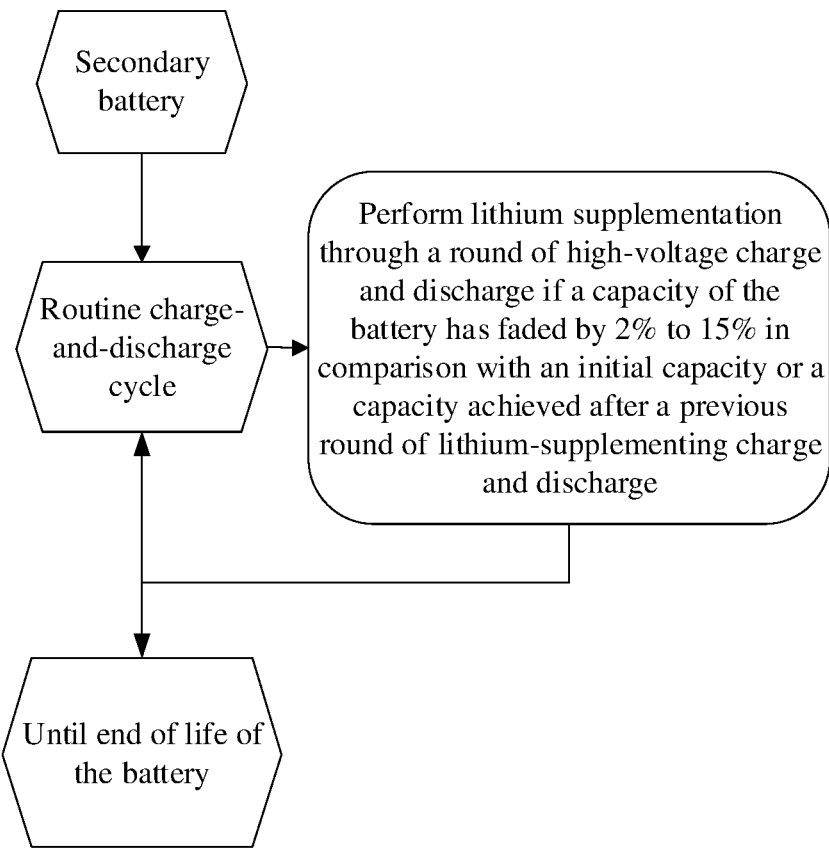
FIG. 7 is a flowchart of a method for charging and discharging a secondary battery according to this application.

FIG. 7 shows a process of charging and discharging a secondary battery.

(1) The secondary battery is subjected to conventional charge-and-discharge cycles by applying a low voltage that ranges from 2.5 to 4.35 V. The cycling process is: Charging the secondary battery at a constant current of 0.04 C in a 25° C. environment until the voltage reaches 4.35 V; leaving the battery to stand for 30 minutes, and then discharging the battery at a current of 1/3 C until the voltage reaches 2.5 V, thereby completing one cycle; and measuring a discharge capacity value of the battery after each cycle.

(2) When a measured value of the discharge capacity of the battery is 5% less than an initial discharge capacity value (a first-cycle discharge capacity value), the battery is subjected to a charge-and-discharge cycle by applying a high voltage that ranges from 2.5 to 4.45 V, so as to supplement lithium. The cycling process is: Charging the lithium-ion battery at a constant current of 0.04 C in a 25° C. environment until the voltage reaches 4.45 V; leaving the battery to stand for 5 minutes, and then discharging the battery at a current of 1/3 C until the voltage reaches 2.5 V, thereby completing one cycle; and then continuing to perform conventional charge-and-discharge cycles, and measuring a discharge capacity value of the battery after each cycle.

(3) When a measured value of the discharge capacity of the battery is 5% less than the discharge capacity value measured after the previous supplementation of lithium, the battery is subjected to a charge-and-discharge cycle by applying a high voltage that ranges from 2.5 to 4.45 V, so as to supplement lithium. The cycling process is the same as that in step (2).

(4) Repeating step (3) until an end of life of the battery.

Embodiments 2 to 7 and Comparative Embodiments 1 to 3

The method for preparing a secondary battery in Embodiments 2 to 7 and Comparative Embodiments 1 to 3 is similar to that in Embodiment 1, but the components of the positive electrode plate and the charge-and-discharge parameters are adjusted. Table 1 shows different components of the positive electrode plate and different charge-and-discharge parameters.

TABLE 1

Different components of positive electrode plate and different charge-and-discharge parameters in Embodiments 1 to 7 and Comparative Embodiments 1 to 3

| Serial number | Positive active material | Lithium supplement material | Mass ratio between positive active material and lithium supplement material | Percentage by which the discharge capacity of battery has reduced when lithium needs to be supplemented | Discharge cut-off voltage in normal cycles and lithium supplementing cycles (V) |
|---|---|---|---|---|---|
| Embodiment 1 | Lithium iron phosphate | Lithium-rich manganese-based material | 1:1 | 5% | 2.5 |
| Embodiment 2 | Lithium nickel cobalt manganese oxide ($LiNi_{0.5}Co_{0.2}Mn_{0.3}O_2$) | Lithium-rich manganese-based material | 1:1 | 5% | 2.5 |
| Embodiment 3 | Lithium iron phosphate | Lithium-rich manganese-based material | 7:3 | 5% | 2.5 |
| Embodiment 4 | Lithium iron phosphate | Lithium-rich manganese-based material | 2:8 | 5% | 2.5 |
| Embodiment 5 | Lithium iron phosphate | Lithium-rich manganese-based material | 1:1 | 2% | 2.5 |
| Embodiment 6 | Lithium iron phosphate | Lithium-rich manganese-based material | 1:1 | 10% | 2.5 |

TABLE 1-continued

Different components of positive electrode plate and different charge-and-
discharge parameters in Embodiments 1 to 7 and Comparative Embodiments 1 to 3

| Serial number | Positive active material | Lithium supplement material | Mass ratio between positive active material and lithium supplement material | Percentage by which the discharge capacity of battery has reduced when lithium needs to be supplemented | Discharge cut-off voltage in normal cycles and lithium supplementing cycles (V) |
|---|---|---|---|---|---|
| Embodiment 7 | Lithium iron phosphate | Lithium-rich manganese-based material | 1:1 | 15% | 2.5 |
| Comparative Embodiment 1* | Lithium iron phosphate | — | — | — | 2.5 |
| Comparative Embodiment 2** | Lithium nickel cobalt manganese oxide | — | — | — | 2.5 |
| Comparative Embodiment 3# | Lithium iron phosphate | Lithium-rich manganese-based material | 1:1 | 0% | 2.5 |

Note:
*The mass of lithium iron phosphate in the positive electrode plate in Comparative Embodiment 1 is equal to the sum of the mass of the lithium iron phosphate and the mass of the lithium-rich manganese-based material in the positive electrode plate in Embodiment 1. The battery in Comparative Embodiment 1 is subjected to just conventional charge-and-discharge cycles. For a detailed process, see paragraph (1) of section 6 in Embodiment 1.
**The mass of lithium nickel cobalt manganese oxide in the positive electrode plate in Comparative Embodiment 2 is equal to a sum of the mass of the lithium nickel cobalt manganese oxide and the mass of the lithium-rich manganese-based material in the positive electrode plate in Embodiment 2. The battery in Comparative Embodiment 2 is subjected to just conventional charge-and-discharge cycles. For a detailed process, see paragraph (1) of section 6 in Embodiment 1.
The battery in Comparative Embodiment 3 is supplemented with lithium during the first charge-and-discharge cycle only. The cycling process is: Charging a lithium-ion battery at a constant current of 0.04 C in a 25° C. environment until the voltage reaches 4.45 V, leaving the battery to stand for 5 minutes, and then discharging the battery at a current of 1/3 C until the voltage reaches 2.5 V; subsequently, performing conventional charge-and-discharge cycles according to the steps described in paragraph (1) of section 6 in Embodiment 1. In order to adapt to a first lithium supplementing process, the mass of the negative active material of the battery in Comparative Embodiment 3 is 9% greater than the mass of the negative active material of the battery in Embodiment 1.

Battery Test

Recording the number of cycles at the end of life of the battery in Embodiments 1-7 and Comparative Embodiments 1-3, where the end of life of the battery means a time point at which the discharge capacity of the battery reduces to 80%. Calculating the cycle capacity retention rate of the battery at the end of 2000 cycles according to the following formula.

$$\text{Cycle capacity retention rate} = 100\% \times \frac{\text{Last cycle discharge capacity}}{\text{First cycle discharge capacity}}$$

Table 2 shows the test results.

TABLE 2

Performance test results of Embodiments
1 to 7 and Comparative Embodiments 1 to 3

| Serial number | Cycle capacity retention rate at end of 2000 cycles | Number of cycles |
|---|---|---|
| Embodiment 1 | 87.2% | 2803 |
| Embodiment 2 | 76.5% | 1668 |
| Embodiment 3 | 84.5% | 2666 |
| Embodiment 4 | 88.7% | 3026 |
| Embodiment 5 | 85.1% | 2746 |
| Embodiment 6 | 84.3% | 2654 |
| Embodiment 7 | 84.1% | 2558 |
| Comparative Embodiment 1 | 80.2% | 2015 |

TABLE 2-continued

Performance test results of Embodiments
1 to 7 and Comparative Embodiments 1 to 3

| Serial number | Cycle capacity retention rate at end of 2000 cycles | Number of cycles |
|---|---|---|
| Comparative Embodiment 2 | 72.6% | 1236 |
| Comparative Embodiment 3 | 81.5% | 2203 |

Table 1 and Table 2 show that:

Compared with Comparative Embodiments 1 to 2 in which just conventional charge-and-discharge cycles are performed, Embodiments 1 to 7 in this application have significantly improved the cycle capacity retention rate and cycle life of the battery by performing a lithium supplementing charge-and-discharge cycle whenever the measured value of the discharge capacity reduces by 2% to 15% during the conventional charge-and-discharge cycles. A strategy of performing a lithium supplementing charge-and-discharge cycle whenever the measured value of the discharge capacity reduces by 2% to 10% can further improve the cycle capacity retention rate and cycle life of the battery. When the mass ratio between the positive active material and the lithium supplement material is 1:1 to 2:8, the improvement of the cycle capacity retention rate and cycle life of the battery is more significant.

Compared with Comparative Embodiment 3 in which the lithium is supplemented through the first charge-and-discharge cycle, Embodiments 1 to 7 of this application have significantly improved the capacity retention rate and cycle life of the battery by performing a lithium supplementing charge-and-discharge cycle whenever the measured value of the discharge capacity reduces by 2% to 15% during the conventional charge-and-discharge cycles. In addition, the mass of the negative active material of the battery in Comparative Embodiment 3 is 9% greater than the mass of the negative active material of the battery in Embodiment 1 of this application. Accordingly, the measured gravimetric energy density of the battery in Comparative Embodiment 3 is approximately 2% lower than the gravimetric energy density of the battery in Embodiment 1 of this application.

It is hereby noted that this application is not limited to the foregoing embodiments. The foregoing embodiments are merely examples. Any and all embodiments with substantively the same composition or exerting the same effects as the technical ideas hereof without departing from the scope of the technical solutions of this application still fall within the technical scope of this application. In addition, all kinds of variations of the embodiments conceivable by a person skilled in the art and any other embodiments derived by combining some constituents of the embodiments hereof without departing from the subject-matter of this application still fall within the scope of this application.

What is claimed is:

1. A method for supplementing lithium for a secondary battery, comprising:
   performing a first round of lithium-supplementing charge and discharge on the secondary battery during routine charge-and-discharge cycles of the secondary battery in response to a capacity of the secondary battery having reduced by k1 in comparison with an initial capacity; and
   performing a round of lithium-supplementing charge and discharge on the secondary battery after the first round of lithium-supplementing charge and discharge in response to the capacity of the secondary battery having reduced by k2 in comparison with the capacity achieved after a previous round of lithium-supplementing charge and discharge;
   wherein:
      k1 and k2 each are in a range from 1.5% to 17%;
      in each round of lithium-supplementing charge and discharge, a number of times of charge and discharge is at least one and a charge cut-off voltage is in a range from 4.45 V to 5 V; and
      a positive electrode plate of the secondary battery comprises a lithium supplement material, and the lithium supplement material is at least one selected from $Li_2O$, $Li_2O_2$, $Li_2S$, $Li_6CoO_4$, $Li_5FeO_4$, $Li_2NiO_2$, $Li_2DHBN$, $Li_2C_2O_4$, and $xLi_2MnO_3 \cdot (1-x)LiNi_{y1}Co_{y2}Mn_{y3}O_2$, wherein $0 < x \leq 1$, y1, y2, and y3 each are in a range from 0 to 1, and a sum of y1, y2, and y3 is 1.

2. The method for supplementing lithium according to claim 1, wherein the charge cut-off voltage is in a range from 4.45 V to 4.6 V.

3. The method for supplementing lithium according to claim 1, wherein k1 and k2 each are in a range from 2% to 15%.

4. The method for supplementing lithium according to claim 3, wherein k1 and k2 each are in a range from 2% to 12%.

5. The method for supplementing lithium according to claim 1, wherein a discharge cut-off voltage applied in the lithium-supplementing charge and discharge is a discharge cut-off voltage applied in a routine charge-and-discharge cycle.

6. The method for supplementing lithium according to claim 1, wherein the lithium-supplementing charge and discharge adopt constant-current charge.

7. The method for supplementing lithium according to claim 1, wherein a charge current applied in the lithium-supplementing charge and discharge is a charge current applied in a routine charge-and-discharge cycle.

8. The method for supplementing lithium according to claim 1, wherein the lithium-supplementing charge and discharge adopt constant-current discharge.

9. The method for supplementing lithium according to claim 1, wherein a discharge current applied in the lithium-supplementing charge and discharge is a discharge current applied in a routine charge-and-discharge cycle.

10. The method for supplementing lithium according to claim 1, wherein, during the lithium-supplementing charge and discharge, charging is performed first, and then discharging is performed after a period of static standing.

11. The method for supplementing lithium according to claim 10, wherein the period of static standing is in a range from 2 to 35 minutes.

12. The method for supplementing lithium according to claim 11, wherein the period of static standing is in a range from 5 to 30 minutes.

13. The method for supplementing lithium according to claim 1, wherein the lithium supplement material comprises $0.4LiNi_{0.5}Co_{0.1}Mn_{0.4}O_2 \cdot 0.6Li_2MnO_3$.

14. The method for supplementing lithium according to claim 1, wherein, in the positive electrode plate, a mass ratio between a positive active material and the lithium supplement material is in a range from 1:8 to 8:1.

15. The method for supplementing lithium according to claim 1, wherein the mass ratio between the positive active material and the lithium supplement material is in a range from 2:8 to 7:3.

16. A method for charging and discharging a secondary battery, comprising:
   supplementing lithium for the secondary battery, comprising:
      performing a first round of lithium-supplementing charge and discharge on the secondary battery during routine charge-and-discharge cycles of the secondary battery in response to a capacity of the secondary battery having reduced by k1 in comparison with an initial capacity; and
      performing a round of lithium-supplementing charge and discharge on the secondary battery after the first round of lithium-supplementing charge and discharge in response to the capacity of the secondary battery having reduced by k2 in comparison with the capacity achieved after a previous round of lithium-supplementing charge and discharge;
      wherein:
         k1 and k2 each are in a range from 1.5% to 17%;
         in each round of lithium-supplementing charge and discharge, a number of times of charge and discharge is at least one and a charge cut-off voltage is in a range from 4.45 V to 5 V; and
         a positive electrode plate of the secondary battery comprises a lithium supplement material, and the lithium supplement material is at least one selected from $Li_2O$, $Li_2O_2$, $Li_2S$, $Li_6CoO_4$, $Li_5FeO_4$, $Li_2DHBN$, $Li_2C_2O_4$, and $xLi_2MnO_3 \cdot (1-x)LiNi_{y1}Co_{y2}Mn_{y3}O_2$, wherein $0 < x \leq 1$, y1, y2, and y3 each are in a range from 0 to 1, and a sum of y1, y2, and y3 is 1; and continuing to perform the routine charge-and-discharge cycles on the secondary battery after the lithium supplementing until an end of life of the secondary battery.

\* \* \* \* \*